(12) United States Patent
Nonaka et al.

(10) Patent No.: US 7,535,489 B2
(45) Date of Patent: May 19, 2009

(54) DIGITAL PLATFORM APPARATUS

(75) Inventors: Osamu Nonaka, Sagamihara (JP); Kazuhiro Sato, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 575 days.

(21) Appl. No.: 11/312,863

(22) Filed: Dec. 20, 2005

(65) Prior Publication Data
US 2006/0132501 A1  Jun. 22, 2006

(30) Foreign Application Priority Data
Dec. 22, 2004  (JP)  ............... 2004-371678

(51) Int. Cl.
*H04N 5/225* (2006.01)
*G09G 5/00* (2006.01)
(52) U.S. Cl. .................. 348/207.1; 348/207.2; 345/619
(58) Field of Classification Search ............. 348/207.2, 348/211.4, 207.1, 211.14; 345/619
See application file for complete search history.

(56) References Cited

U.S. PATENT DOCUMENTS 7,029,128 B2 * 4/2006 Nishio et al. ............... 353/94

2004/0212822 A1 * 10/2004 Schinner ................ 358/1.15

FOREIGN PATENT DOCUMENTS

| JP | 11-57216 | 3/1999 |
|---|---|---|
| JP | 2001-109570 | 4/2001 |
| JP | 2004-12712 | 1/2004 |
| JP | 2004-164069 | 6/2004 |

\* cited by examiner

*Primary Examiner*—Tuan V Ho
*Assistant Examiner*—Selam T Gebriel
(74) *Attorney, Agent, or Firm*—Straub & Pokotylo; John C. Pokotylo

(57) ABSTRACT

In a digital platform apparatus of the present invention, a position of a camera mounted on a screen in a display unit is detected by a position detection unit, and image data is transferred from the camera via a communication unit in accordance with a predetermined instruction operation. The transferred image data is supplied from a control unit to a projector via a display control unit. When the image data is transferred, the transferred image is displayed on the screen from the projector. All image data recorded in the camera is displayed in a demagnified form in the vicinity of the camera, and when image data specified by a predetermined operation is transferred into a recording area, a demagnified image of the transferred image data is displayed in the vicinity of the recording area.

7 Claims, 9 Drawing Sheets

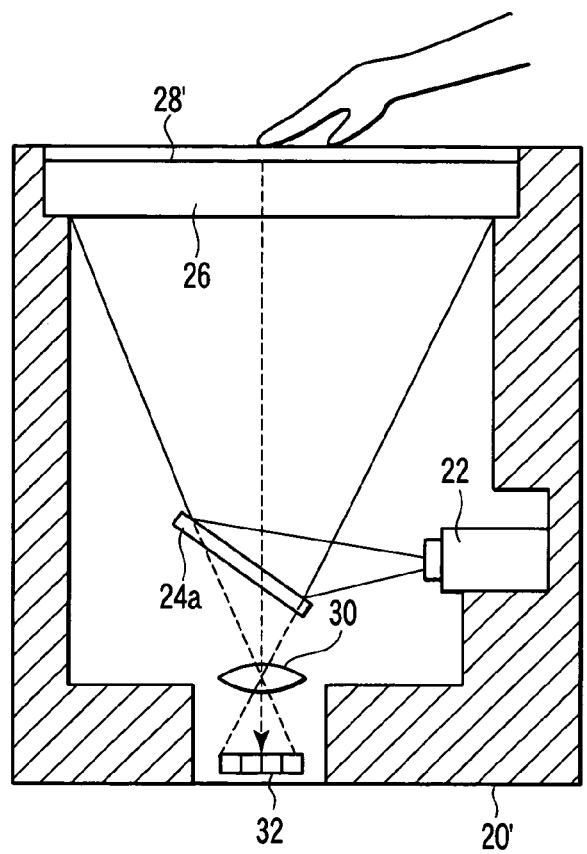
F I G. 6
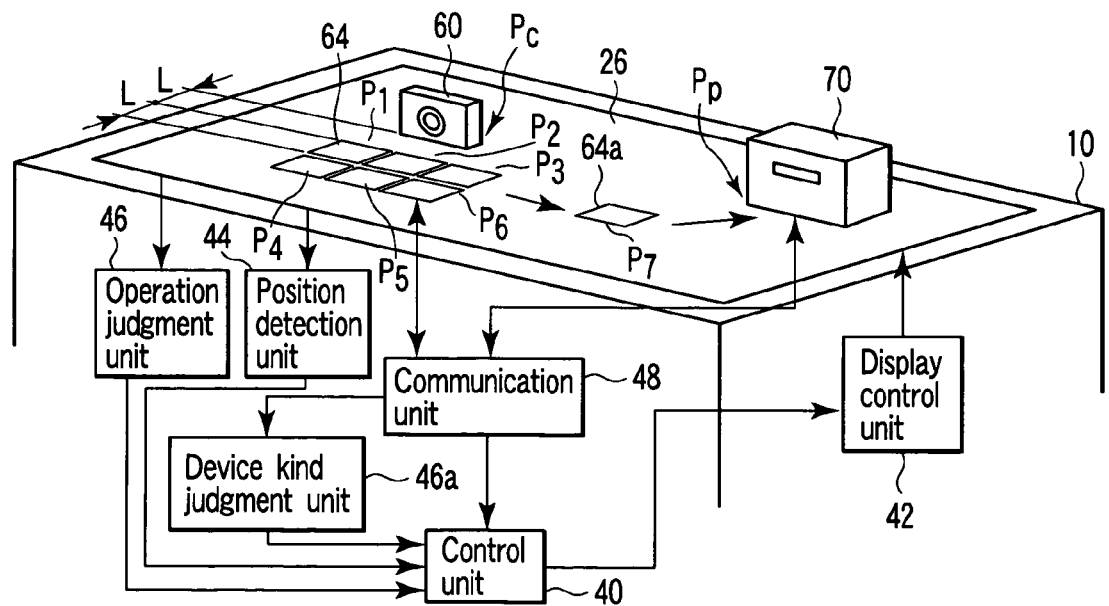
F I G. 7

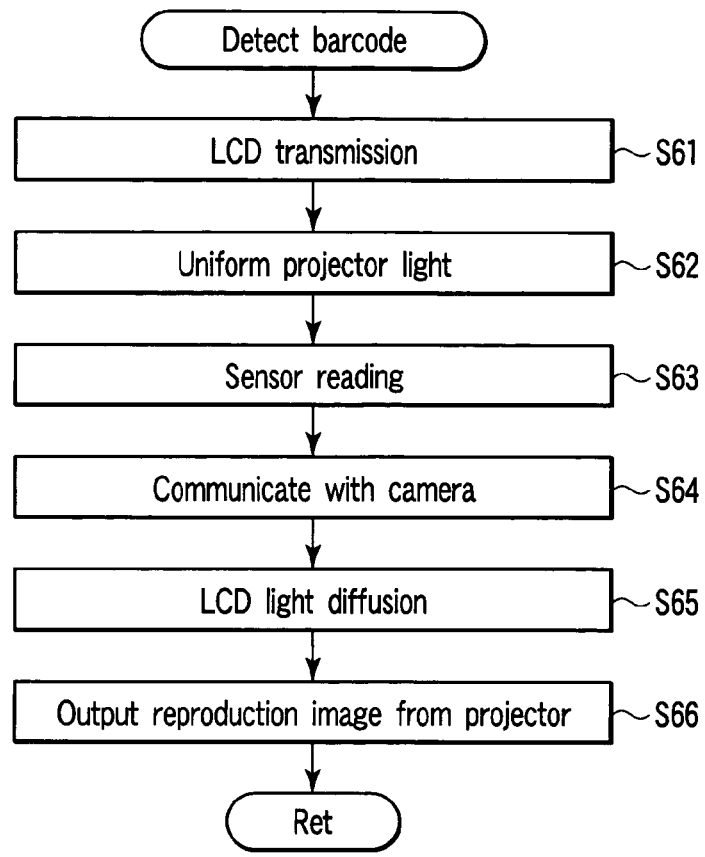
F I G. 1 5
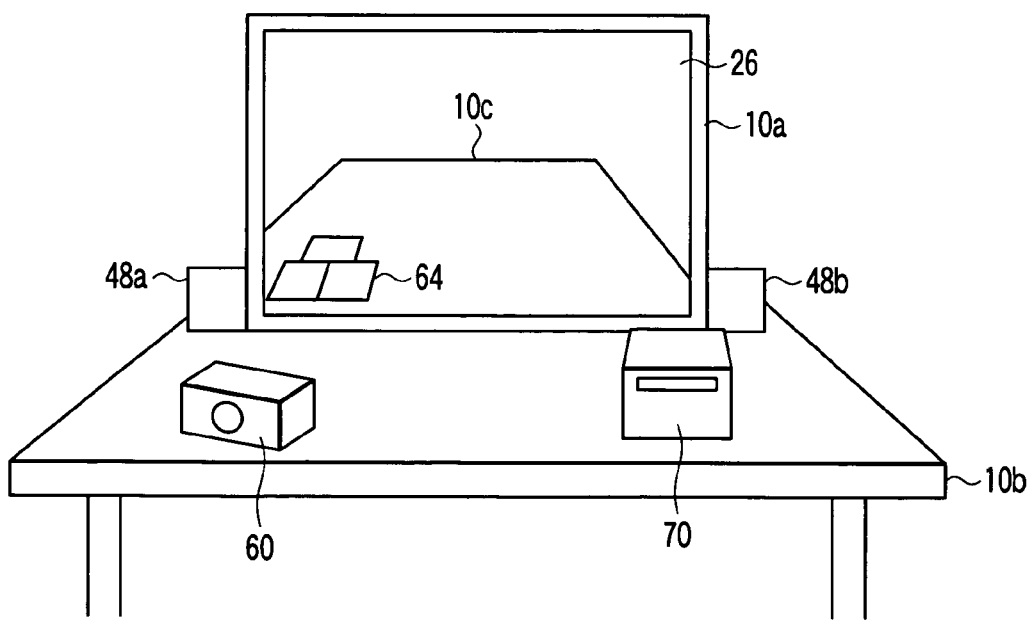
F I G. 1 6

DIGITAL PLATFORM APPARATUS

CROSS-REFERENCE TO RELATED APPLICATIONS

This application is based upon and claims the benefit of priority from prior Japanese Patent Application No. 2004-371678, filed Dec. 22, 2004, the entire contents of which are incorporated herein by reference.

BACKGROUND OF THE INVENTION

1. Field of the Invention

The present invention relates to a digital platform apparatus, and more particularly, to an improvement of a user interface which makes it easier to handle image data.

2. Description of the Related Art

Recently, a table-type display device has already been proposed wherein image data is displayed on a table-shaped display utilizing a projector to provide display means which enables a plurality of people to enjoy.

Moreover, for example, Jpn. Pat. Appln. KOKAI Publication No. 2004-12712 discloses a table-type display in which a luminous flux projected from a projector is reflected by a mirror and projected on a predetermined area of a horizontally placed screen, and the screen comprises a transparent base member which reduces bending and a diffusion screen which forms an image.

Furthermore, Jpn. Pat. Appln. KOKAI Publication No. 11-57216 has proposed an information apparatus utilizing a table, and this fighting-type game apparatus comprises a camera and a projector, wherein a physical target on the table is detected to display an image for a game on the table.

Another proposal has been made wherein an object is displayed on a table, and an operation is performed for the displayed object to move this object (Jpn. Pat. Appln. KOKAI Publication No. 2001-109570).

Still another proposal of a new interface environment has been disclosed in Jpn. Pat. Appln. KOKAI Publication No. 2004-164069. This technique concerns an information control system which identifies a physical object on the basis of an input image in the camera and updates, in a projector, information provided to a display surface in accordance with an execution result of a task for the physical object.

Under the existing circumstances, in order to use a combination of devices which deal with image data, such as a digital camera, a printer, a storage and a projector, it is necessary to individually connect each of them by a cable or by wireless. In the future, a digital platform apparatus will be needed which serves as a common basis of the digital devices so that the devices can be combined in a simpler and easier manner.

BRIEF SUMMARY OF THE INVENTION

It is an object of the present invention to provide a digital platform apparatus which clarifies locations of devices mounted on a table and data as well as transmission/receiving processes of signals to be transmitted and signals to be received so that the signals can be transmitted/received in a manner reliable and easy for users to understand.

That is, a first characteristic of the present invention is to provide a digital platform apparatus comprising:

a transmitter configured to store image data and transmit the stored image data;

a receiver configured to receive the image data;

a projection unit which projects an image corresponding to the image data received by the receiver;

a display unit on which the transmitter and the receiver are mounted and which displays an image projected by the projection unit;

a position detection unit which detects positions of the transmitter and the receiver mounted on the display unit; and a control unit which controls image data transfer from the transmitter to the receiver in accordance with a predetermined operation, the control unit controlling the projection unit to display an image corresponding to image data recorded in the transmitter in the vicinity of the transmitter detected by the position detection unit, and to display an image corresponding to image data specified by the predetermined operation in the vicinity of the receiver detected by the position detection unit when the image data is transferred to the receiver.

A second characteristic of the present invention is to provide a digital platform apparatus comprising:

a mounting unit to mount a transmitter which transmits image data recorded therein;

a position detection unit which detects a position where the transmitter is mounted;

an operation judgment unit which detects an operation performed on the mounting unit as an instruction to the transmitter;

a communication unit which performs image data communication with the transmitter;

a recording unit which records the image data communicated by the communication unit;

a display unit which displays an image on the mounting unit; and a control unit which performs control so that an image concerning the imaging data transmitted from the transmitter is displayed as an image recorded in the transmitter in the vicinity of the mounted transmitter, and so that the image data transmitted from the transmitter in accordance with the operation is recorded in the recording unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a diagram showing another configuration example of a display device section in the first embodiment;

FIG. 7 is a diagram showing a configuration of a digital platform apparatus according to a second embodiment of the present invention;

FIGS. 13A to 13C show other examples of detecting a position of the device mounted on the screen, wherein FIG. 13A is a diagram showing an example in which a two-dimensional bar code is provided on a lower surface portion of a camera as such a device, FIG. 13B is a diagram showing an example in which an IC tag is provided on the lower surface portion of the camera, and FIG. 13C is a diagram showing an example in which an infrared communication device is provided on the lower surface portion of the camera;

FIG. 15 is a flowchart to explain an operation of detecting the barcode by the position detection system of the camera having a configuration shown in FIG. 14; and FIG. 16 shows a further modification of the first and second embodiments of the present invention wherein a virtual table is used in a flat panel display.

DETAILED DESCRIPTION OF THE INVENTION

Embodiments of a table-type display apparatus according to the present invention will hereinafter be described in reference to the drawings.

FIRST EMBODIMENT

Figure 1:
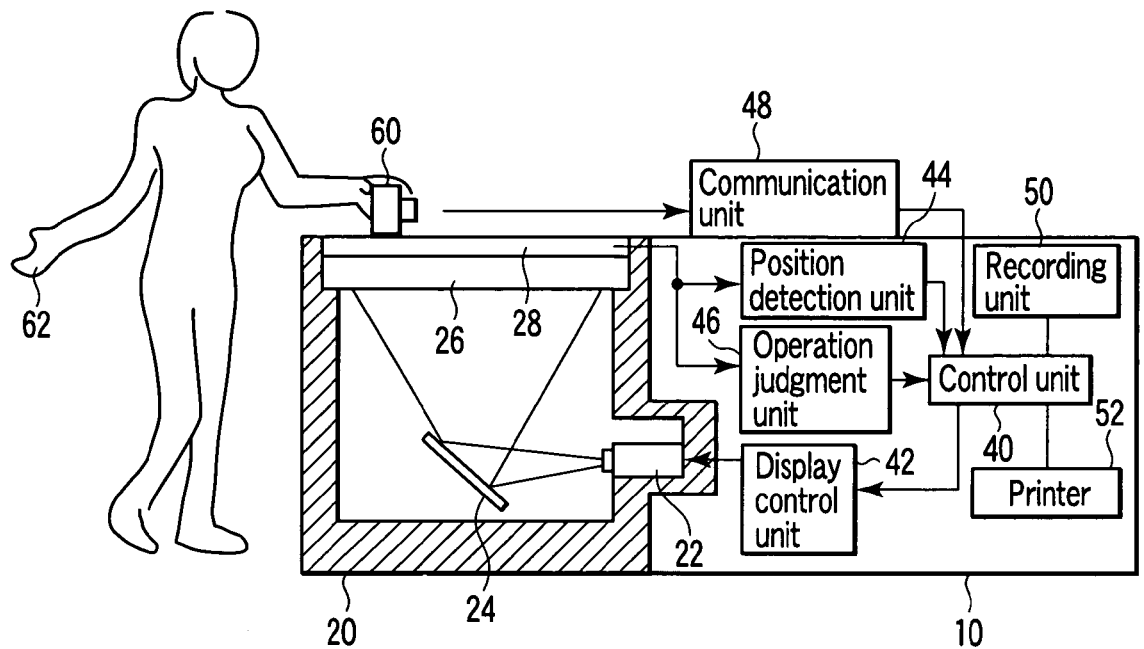
FIG. 1 is a block diagram showing a configuration of a digital platform apparatus according to a first embodiment of the present invention.

FIG. 1 is a block diagram showing a configuration of a table-type screen apparatus according to a first embodiment of the present invention. The table-type screen is one of concrete examples of a digital platform apparatus.

In FIG. 1, a table-type screen apparatus 10 comprises a display unit 20, a control unit 40 which is control means, a display control unit 42, a position detection unit 44 which is position detection means, an operation judgment unit 46 which is operation judgment means, a communication unit 48 which is interface means, a recording unit 50 and a printer 52. The display unit 20 comprises a projector 22 as projection means which projects an image, a mirror 24 which leads a projected image to a screen 26, the screen 26 which is display means, and a touch panel 28 configured as a surface sensor part (plane member).

The screen 26 comprises a transparent base member having a predetermined thickness, and a diffusion screen member. Thus, a table does not bend when force is applied onto the screen. That is, the screen 26 does not bend or break even if the touch panel 28 provided on the screen 26 is pressed or even if press force is applied to the screen by mounting a device such as a camera 60 as described later.

The touch panel 28 is a touch switch which detects a device or movement of a finger of a user on the screen 26. The touch panel 28 used has electric properties varying in accordance with force pressing the panel.

The control unit 40 controls/operates the entire table-type screen apparatus 10, and comprises a microcontroller. The display control unit 42 controls an image projected by the projector 22. The position detection unit 44 detects positions where the camera 60 and a printer 70 are mounted on the screen 26 as described later. The operation judgment unit 46 detects and judges a position of the touch panel 28 pressed by a user operation. Further, the communication unit 48 performs data communication with the camera 60 mounted on the screen 26 to receive image data compressed and stored by an image processing circuit in the camera 60.

The recording unit 50 records image data imported by the camera 60 via the communication unit 48. The recording unit 50 manages images by use of a group called "album". The printer 52 outputs an obtained image to paper or the like.

In such a configuration, a user 62 mounts, on the table-shaped screen 26, the camera 60 which has data on taken images. At this point, the camera 60 becomes a transmitter. Then, the touch panel 28 responds to this, and the position detection unit 44 detects a position of the camera 60. Further, the communication unit 48 of the table-type screen 10 starts communication with a communication unit of the camera 60. Then, the control unit 40 causes the display unit 20 to display an image corresponding to the image data input by the communication.

Figure 2:
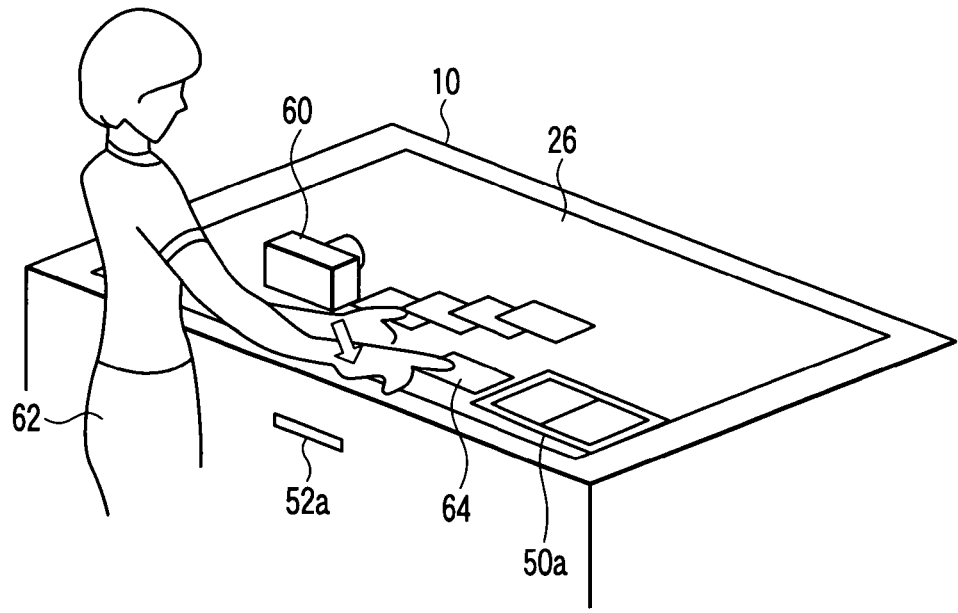
FIG. 2 is a diagram showing an example in which a user operates the digital platform apparatus of FIG. 1.

That is, in the display unit 20, the image is projected by the projector 22 via the display control unit 42 in accordance with the control unit 40, and further reflected by the mirror 24 to be displayed on the screen 26. Here, the images projected by the projector 22 are not only the images obtained from the camera 60 but may also include images other than those in the camera 60. In addition, the image projected from the projector 22 by the display control unit 42 is laid out so that it is displayed in the vicinity of the camera 60, as shown in FIG. 2.

The touch panel 28 on the screen 26 also detects the position of the camera 60. Then, the control unit 40 causes the display control unit 42 to display the image corresponding to the image data obtained from the camera 60 in the vicinity of the camera 60. Further, a recording area 50a to store the albums is displayed at a position in a right corner of the screen 26, as shown in FIG. 2. When the user 62 drags an arbitrary image 64 on the screen 26 and brings it to the position of the recording area 50a, the image is recorded in the album provided in the recording unit 50. At this point, the image 64 is flowingly moved from the position of the camera 60 to the position of the recording area 50a in accordance with the dragging of the finger. For example, when a plurality of images is moved, they are sequentially moved from the camera 60 to the recording area 50a as if the slides are displayed. Such an application is also possible.

In order to achieve such a drag function, the table-type screen 10 has the operation judgment unit 46 which detects and judges the pressed position of the touch panel to detect a position of the finger of the user. When the operation judgment unit 46 judges that the touch panel 28 is pressed, the control unit 40 controls, on the basis of a result of the judgment, the display control unit 42 to switch displays as if the image 64 is dragged on the screen 26.

Furthermore, when the image 64 is stored in the album, the control unit 40 controls the recording unit 50 so that it records image data corresponding to the image 64. That is, the control unit 40 detects the position of the camera 60 and an operation input by the user 62 through the touch panel 28, the position detection unit 44 and the operation judgment unit 46. Then, the control unit 40 imports the image data input by the communication unit 48 in accordance with the above-mentioned position of the device such as the camera 60 and the above-mentioned operation, and the display control unit 42 is controlled to display a corresponding image at a position conforming to the above-mentioned operation.

Figure 3:
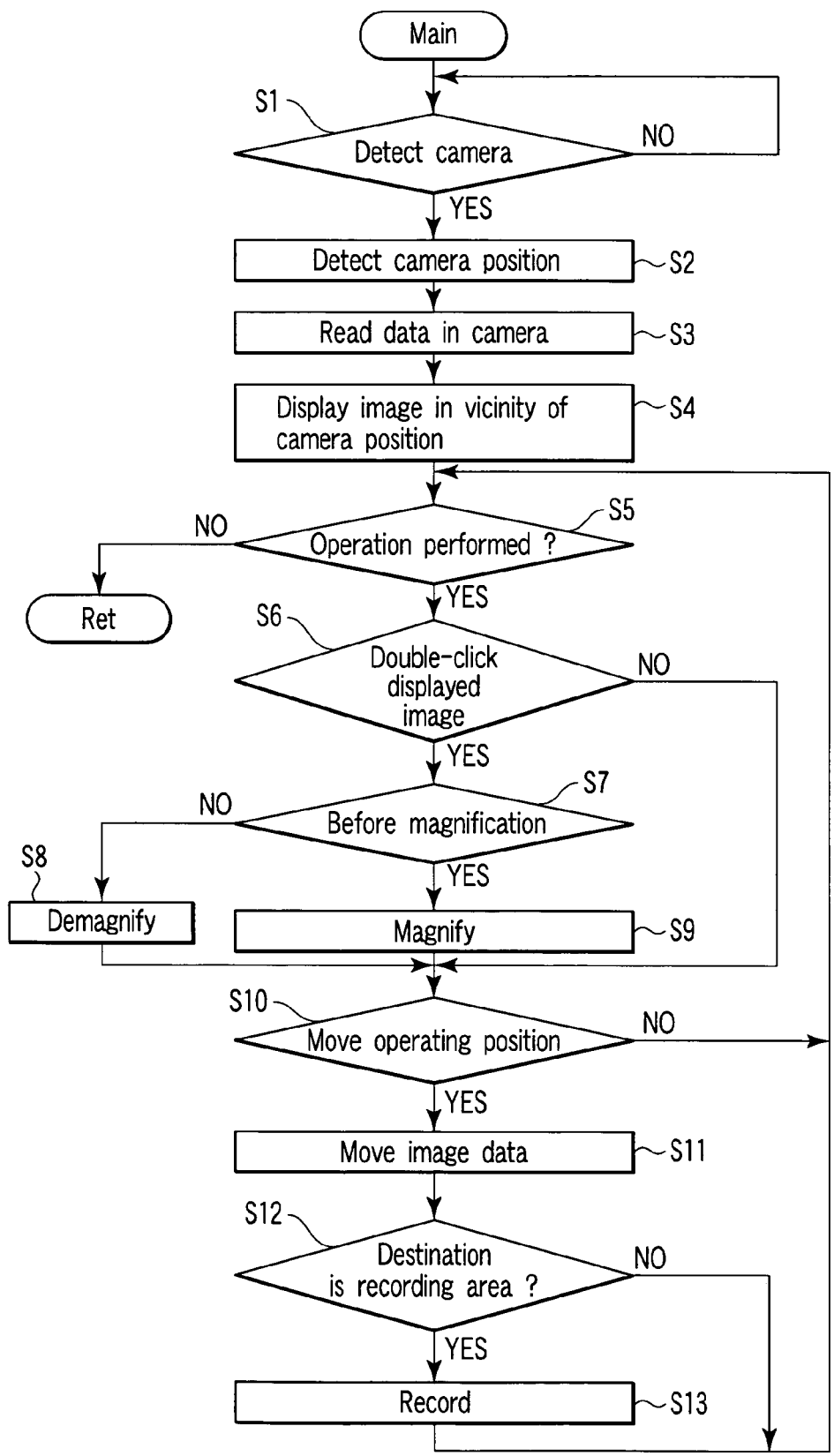
FIG. 3 is a flowchart to explain a main operation of the digital platform apparatus according to the first embodiment.

FIG. 3 is a flowchart to explain a procedure in which the control unit 40 performs an operation in accordance with a control program to execute the processing described above.

When an unshown power switch of the table-type screen apparatus 10 is turned on, it is judged in step S1 whether or not the camera 60 is mounted on the screen 26. When the user 62 mounts the camera 60 on the table-shaped screen 26, it is detected from a change in press force at this moment that the camera 60 has been mounted. Then, the position of the camera is detected by the position detection unit 44 in accordance with the pressed position of the touch panel 28 in step S2.

Next, data in the camera 60 is read by the communication unit 48 in step S3. Then, in step S4, the display control unit 42 is controlled so that an image corresponding to the data read at the moment is projected for reproduction/display in the vicinity of the camera position detected in step S2.

Subsequently, it is judged in step S5 whether or not the user 62 has made an operation. Here, if no operation has been made, a main routine terminates. On the other hand, if some operation has been made, a transition is made to step S6 where processing corresponding to the operation is performed.

That is, a judgment is made as to a state in which the touch panel 28 is pressed and as to a change in the pressed position. For example, it is judged in step S6 whether or not the displayed image has been double-clicked (double-tapped). Here, when it has not been double-clicked, a transition is made to step S10 described later. On the other hand, when it has been double-clicked, a transition is made to step S7 and it is judged whether or not this image is an image before magnification.

Here, if this image is the image before magnification, a transition is made to step S9, and a magnified image is displayed. On the other hand, when the image is judged not to be the image before magnification, that is, when it is judged to be an image after magnification, a transition is made to step S8, and the image demagnified to an original size is displayed. Thus, it is designed so that the user 62 can handle the image in a desired size in step S8 or S9; for example, the user 62 can check or enjoy magnified images or organize demagnified images. This is achieved in such a manner that the control unit 40 controls the display control unit 42. When the image is magnified, for example, the above-mentioned image may be displayed so that it accounts for a great percentage of the entire screen.

In step S10, it is judged by the operation judgment unit 46 whether or not the finger traces on the table-shaped screen 26 to shift from a particular position to a different position, that is, whether nor not an operating position has been moved. Here, if the operating position has not been moved, a return is made to step S5 described later, whereas if it has been moved, a transition is made to step S11.

In step S11, a display position is changed so that the image is moved to the different position. It is then judged in step S12 whether or not a destination of the image is the position shown as the recording area 50a in FIG. 2. Here, if the destination is the recording area 50a, a transition is made to step S13, and the image data is recorded in the album section of recording unit 50.

Figure 4:
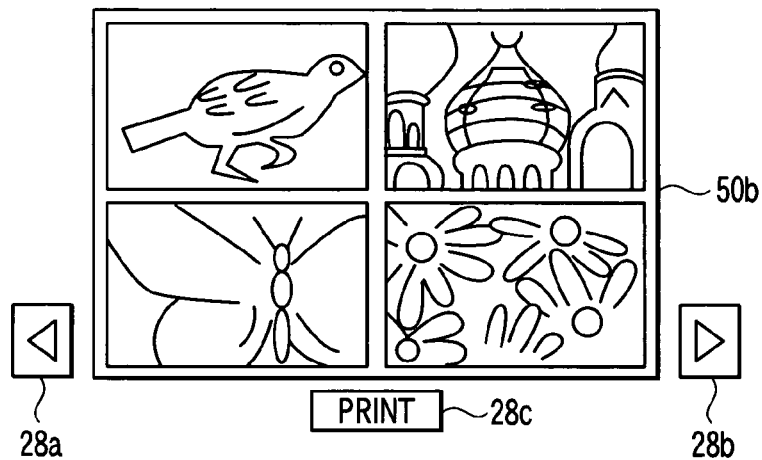
FIG. 4 is a diagram showing an example of an album created in a recording area of FIG. 2.

FIG. 4 shows an example of the album thus created. This album screen 50b is one example of a display form of an album created in the recording unit 50 of the table-type screen apparatus.

In this way, the moved images are displayed as if they are in one page of a real album mounted on the table. That is, virtual display is achieved in the same manner as display in paper albums. In this case, if the user 62 touches a triangle switch icon 28a or 28b, pages can be forwarded or returned, thereby allowing the user to enjoy the images in the album. A display position of this album screen 50b can also be changed to an arbitrary position on the table by a drag operation.

Furthermore, if a print icon 28c is pressed, the image is printed out on paper from a print output discharge 52a (see FIG. 2).

It is to be noted that when the destination is not the recording area 50a in step S12 and after recording is finished in step S13, a transition is made to step S5, and the subsequent processing is repeated.

Moreover, optical communication is also possible as a communication method of the communication unit 48, but communication using weak radio waves such as Bluetooth is preferred because it is preferable to have no directivity.

Figure 5:
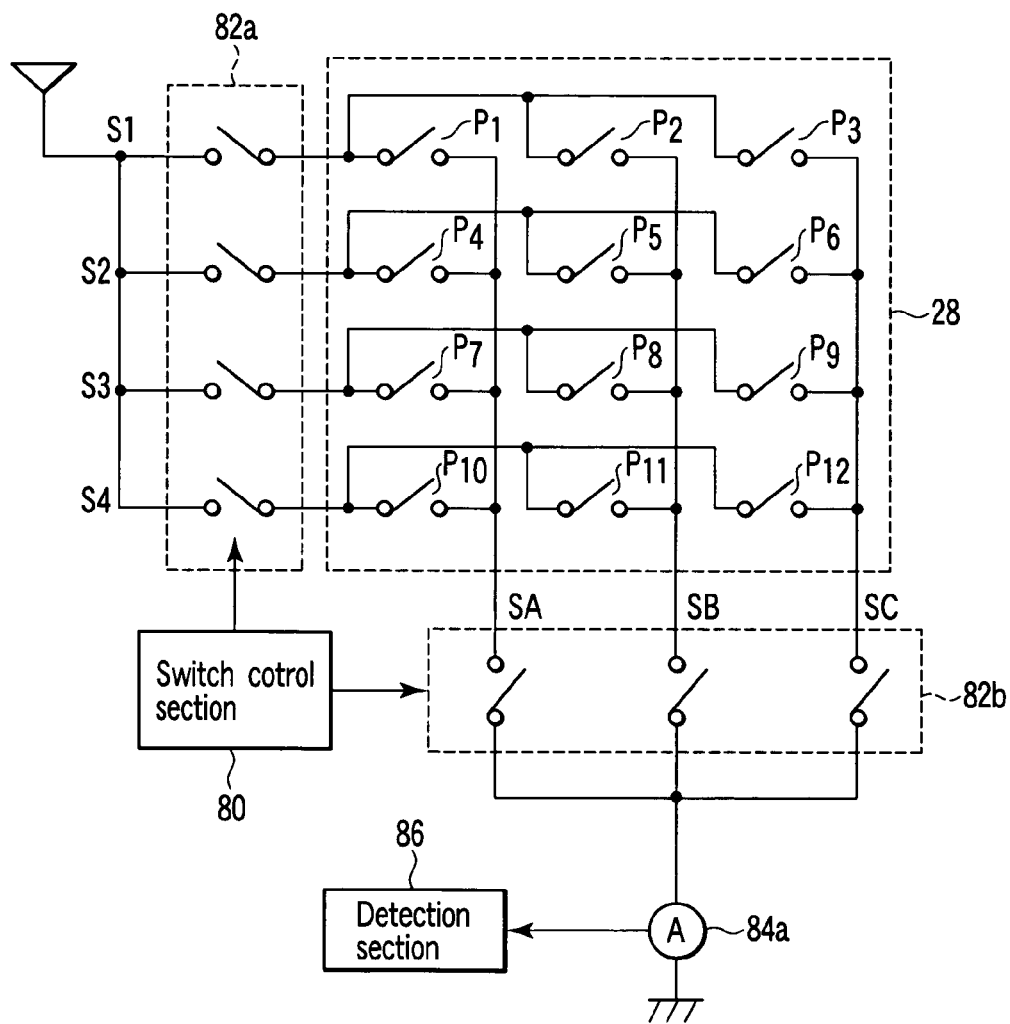
FIG. 5 is a diagram showing a configuration example of a touch panel in the first embodiment.

Furthermore, the touch panel 28 may have a configuration as shown in FIG. 5, for example.

In other words, a plurality of switches constituted of transparent electrodes such as $P_1$ to $P_{12}$ is provided on the touch panel 28, and it may be judged which switch is pressed and turned on. That is, switches in switch sections 82a and 82b are sequentially turned on/off by a switch detection section 80 in a time-series manner. If a detection section 86 judges and detects whether or not conduction is permitted at this moment in accordance with, for example, an output result of an ammeter 84, it is possible to judge which switch (which place) is pressed.

For example, in a case where the finger or the device is placed at a position of the switch $P_1$ and the switch is thus turned on, a current is detected by the ammeter 84 when a switch S1 of the switch section 82a and a switch SA of the switch section 82b are turned on.

Here, the touch panel 28 is simplified with the twelve switches $P_1$ to $P_{12}$, but actually, a large number of such switches are laid.

Furthermore, the display unit 20 described above may have a configuration as shown in FIG. 6.

That is, in a display unit 20', a panel 28' whose reflection changes when pressed by the finger is disposed on the screen 26, and a mirror which leads light of the projector 22 to the screen 26 comprises a half mirror 24a or a mirror having wavelength conductivity. Thus, a change in shade due to the change in reflection is detected by an image pickup device 32 via a light-receiving lens 30, thereby detecting the position of the finger.

Naturally, the display unit 20 according to the first embodiment described above may be configured by a combination of the touch panel shown in FIG. 5 and the display unit 20' shown in FIG. 6.

The use of such a touch panel type screen allows the position of the device or the finger to be judged. Whether it is the device or the finger is judged in accordance with a size or a shape of a range of a pressed portion or in accordance with a communication result of the communication unit 48 described above.

That is, in the example of the touch panel shown in FIG. 5, the number of pressed switches is small and there is a change with time, for example, when the drag is performed in a case of the finger. On the other hand, when the camera 60 is mounted, the number of pressed switches is great, there is no change with time, and predetermined communication can be established with the communication unit 48.

SECOND EMBODIMENT

Next, a second embodiment of the present invention will be described.

The first embodiment has been described above with the example wherein one device (camera) is mounted on a screen, but the second embodiment will be described with an example wherein a plurality of devices is mounted on the screen.

FIG. 7 is a diagram showing a configuration of a digital platform apparatus according to the second embodiment of the present invention.

It is to be noted that in the embodiment described below, the configuration and a basic operation of the digital platform apparatus are the same as those in the first embodiment shown in FIGS. 1 to 6. Therefore, the same reference numerals are assigned to the same parts in these configurations and operations. These parts are not shown and described, and different parts and operations are only described.

On a screen 26, there are mounted a camera 60 in which captured image data is recorded, and a printer 70. In order to obtain a desired image print from the printer 70, an image in the camera 60 as a transmitter is displayed (images 64) on the screen 26 as shown in FIG. 7. Only for one (64a) selected from these images, data transmission/reception are displayed in such a form that the image is brought into the printer 70 as a receiver, so that it is possible to prevent an image different from a photograph intended by a user from being erroneously printed.

To achieve such an embodiment, in a configuration of the second embodiment, the camera 60 and the printer 70 wirelessly communicate with a communication unit 48 of the table-type screen 26, and a device kind judgment unit 46a which judges the kind of a device is provided between the communication unit 48 and a control unit 40.

This can be easily realized if each device transmits a signal indicating its function and if a position detection unit 44 can detect the position of each device.

For example, when the camera 60 is mounted at a position as shown in FIG. 7, the images 64 are displayed in its vicinity. If the user drags one of the images 64, the position is displayed in accordance with movement of the finger while being moved as the image 64a. If it is judged that the image has been moved to a location close to the printer 70 by a display control unit 42, it is judged that the user desires to print the image by the printer 70. The control unit 40 transmits the image data to the printer 70 via the communication unit 48, and the printer 70 prints out an image corresponding to the transmitted data.

Furthermore, in FIG. 7, the image 64a alone is shown, but naturally, it is also possible to display an image obtained from the camera 60 in the vicinity of the printer 70.

Thus, to ensure that an photographic image selected by the user is printed out, it is necessary for the control unit 40 to always recognize which image data is displayed at which position.

Figure 8:
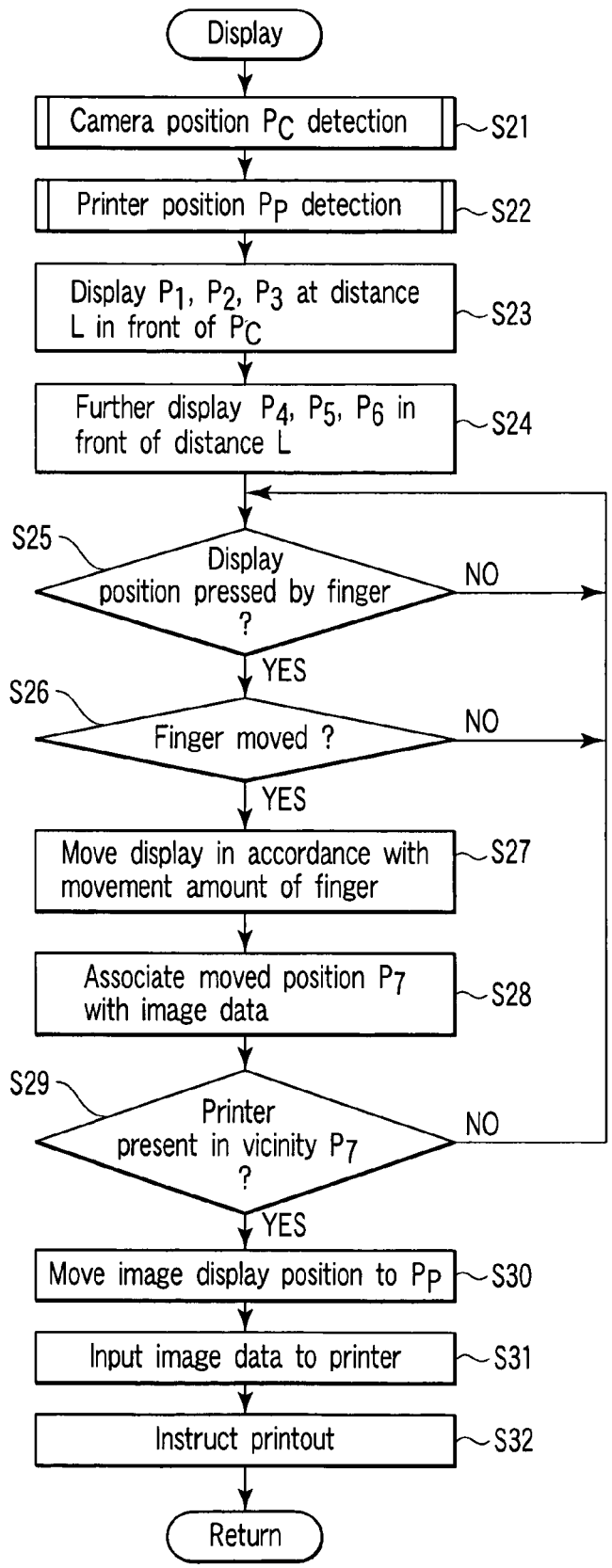
FIG. 8 is a flowchart to explain an image data display operation by the digital platform apparatus of the second embodiment.

FIG. 8 is a flowchart to explain an image data display operation by the digital platform apparatus of the second embodiment. A method of recognizing the display position of the image will be described below referring to this flowchart.

First, a subroutine "camera position $P_C$ detection" is performed in step S21, and then a subroutine "printer position $P_P$ detection" is performed in step S22. It is to be noted that details of the subroutines in steps S21 and S22 will be described later.

Next, in step S23, the image data read from the camera 60 is reproduced at screen positions $P_1$ to $P_3$ kept at a distance L in front of the detected position $P_C$ of the camera 60 as shown in FIG. 7, and three images 64 are displayed side by side. Further, in subsequent step S24, other photographic images are displayed at positions $P_4$ to $P_6$ at the distance L in front of the positions $P_1$ to $P_3$. It is to be noted that this distance L corresponds to a longitudinal size of the image.

Thus, the control unit 40 considers the camera position to decide the display position.

Next, in step S25, it is judged whether or not this display position has been pressed. Here, when a size and shape of the press correspond to those of a tip of the finger, it is judged that there has been finger pressing at the display position, and a transition is made to step S26. This pressed portion is sequentially detected, and it is judged in step S26 whether it has moved.

When the finger has not moved in step S26 or when there has been no pressing in step S25, a transition is made to step S25. On the contrary, when it is judged in step S25 that there has been pressing and it is judged in step S26 that the image has been moved, a transition is made to step S27. In accordance with the movement described above, the image displayed at that portion is also moved. Further, in subsequent step S28, a current position $P_7$ is associated with the image every movement.

As a result of this association, it is judged in step S29 whether or not the position in question and the printer position $P_P$ detected in step S21 are within a predetermined distance. Here, if they are not within the predetermined distance, a transition is made to step S25. On the other hand, if the printer position $P_P$ is within the predetermined distance, a transition is made to step S30.

In step S30, the display position is moved as if the image 64a is sucked and brought into the printer 70. Then, in step S31, digital image data corresponding to the displayed image is input to the printer 70. Further, in step S32, an instruction is transmitted to the printer 70 to print out the image input in the printer 70. Thus, the printer 70 prints the transmitted image data as an image.

In this way, the user selects preferred one of the photographic image data in the camera as if a picture is present at hand, and can have the image printed from the printer without fail.

Next, a method of detecting the devices in the digital platform apparatus according to the second embodiment will be described referring to FIG. 9.

When the camera 60 having a quadrangular bottom of $\Delta x_c \times \Delta y_c$ is mounted on the touch panel type screen 26 of the table-type screen apparatus 10, the touch panel is pressed in that range ($\Delta x_c \times \Delta y_c$). For example, this will be explained using the switches having the configuration shown in FIG. 5. The switches corresponding to the bottom of the camera are turned on, so that the position of the camera can be detected from the range of the switches that are turned on in accordance with a flowchart in FIG. 10.

Figure 10:
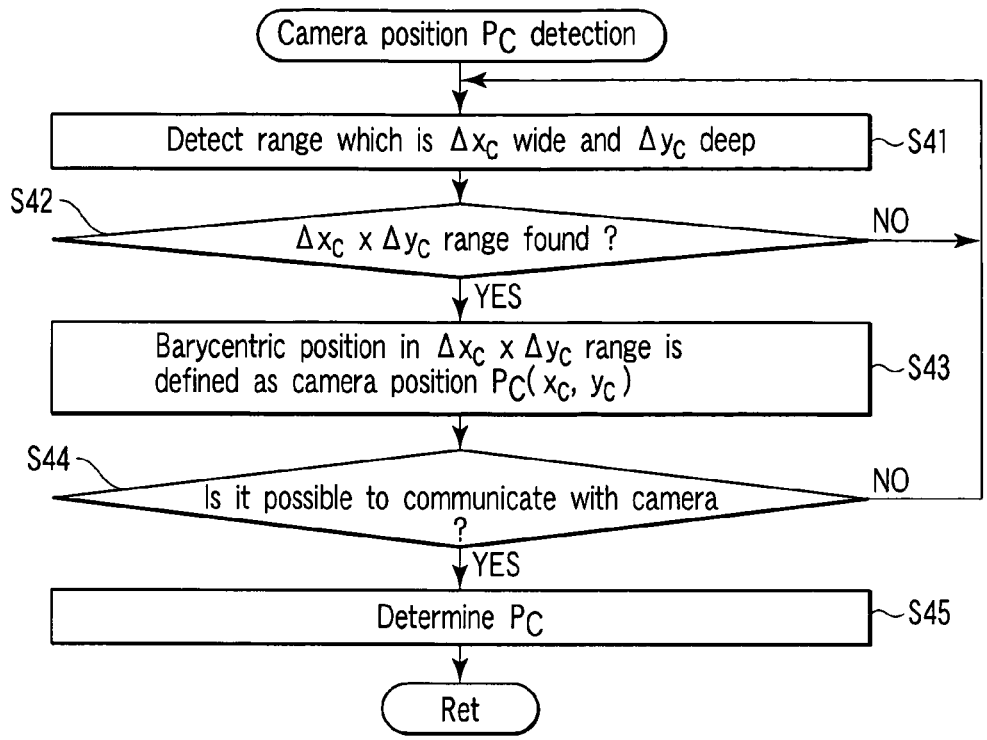
FIG. 10 is a flowchart to explain an operation of a subroutine "camera position detection $P_C$" in step S21 of the flowchart of FIG. 8.

FIG. 10 is a flowchart to explain an operation of the subroutine "camera position $P_C$ detection" in step S21 of the flowchart of FIG. 8.

When a main routine begins, it is first detected in step S41 whether or not there is a part that is turned on within a range corresponding to $\Delta x_c \times \Delta y_c$ among ranges where the switches are turned on. Then, in step S42, it is judged whether or not there is a part that is turned on in the above range. Here, if there is not any part that is turned on in the above-mentioned range, a transition is made to step S41. On the other hand, if there is a part that is turned on in the above-mentioned range, a transition is made to step S43.

In step S43, barycentric position coordinates $x_c$, $y_c$ in the above-mentioned range are calculated and defined as the camera position $P_C$. However, since a thing mounted in this range can be a box instead of the camera, it is confirmed in subsequent step S44 whether or not the communication unit 48 has performed proper handshake with the camera 60.

Here, when it is judged that the thing is not the camera, a transition is made to step S41. On the other hand, when it is judged that the thing is the camera, a transition is made to step S45, and the camera position $P_C$ is determined. Subsequently, the present subroutine is finished.

Figure 11:
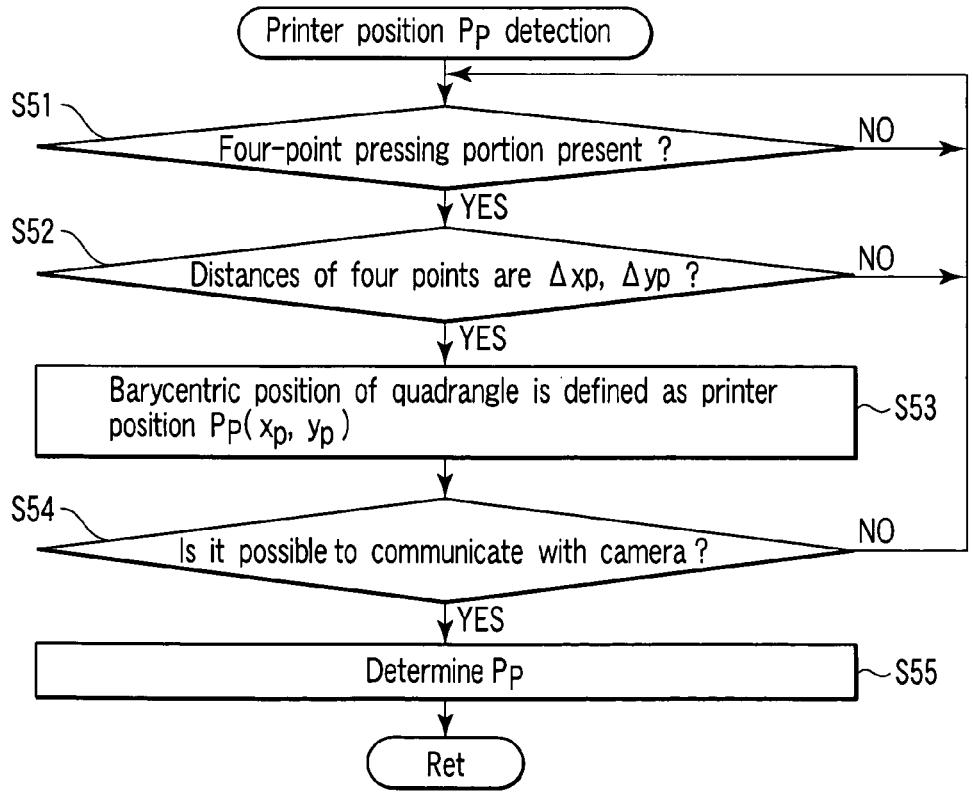
FIG. 11 is a flowchart to explain an operation of a subroutine "printer position detection $P_P$" in step S22 of the flowchart of FIG. 8.

FIG. 11 is a flowchart to explain an operation of the subroutine "printer position $P_P$ detection" in step S22 of the flowchart of FIG. 8.

Figure 9:
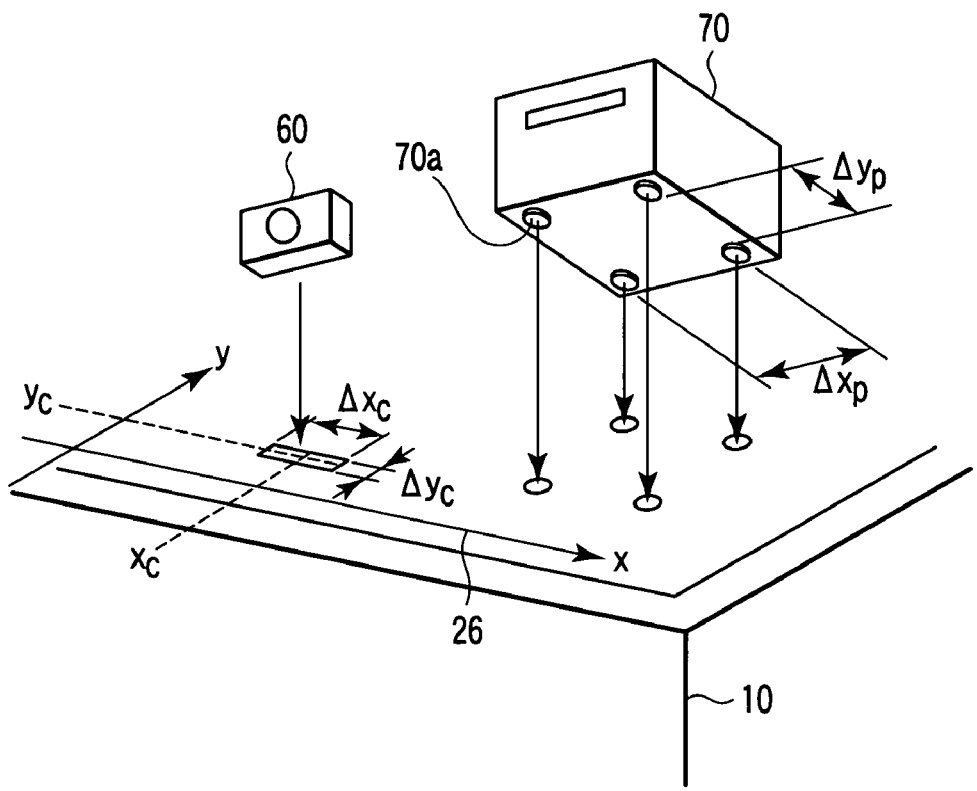
FIG. 9 is a diagram to explain a method of detecting devices in the digital platform apparatus of the second embodiment.

Here, the printer 70 is provided with feet 70a at four places on the bottom as shown in FIG. 9, and a space between the feet is $\Delta x_p$, $\Delta y_p$. The printer position is judged depending on whether or not a pressed portion which satisfies this condition is detected on the panel.

When a main routine begins, it is first judged in step S51 whether or not there is pressing corresponding to the four feet 70a. Here, when there are four pressed portions, it is judged in subsequent step S52 whether or not distances between the feet 70a satisfy a predetermined condition. When there are not four pressing positions in step S51 or when the distances between the feet 70a do not satisfy the predetermined condition in step S52, a transition is made to step S51.

On the other hand, when there are four pressed portions and the distances between the feet 70a satisfy the predetermined condition in steps S51 and S52, a transition is made to step S53. In step S53, coordinates $x_p$, $y_p$ of a barycentric position of a quadrangle whose corners are the four feet 70a are calculated, and this position is defined as the position of the printer.

However, as in step S44 of the flowchart of FIG. 10, a thing mounted at the barycentric position may not be the printer, so that it is judged in step S54 whether or not it is possible to communicate with the printer. Then, if it is possible to communicate with the printer, the thing is determined to be the printer, and a transition is made to step S55, thereby determining the printer position $P_p$. On the other hand, when it is judged that the thing is not the printer in step S54, a transition is made to step S51.

It is to be noted that the camera and the printer have been described here by way of example. However, position detection and communication can be made the most of to ensure data transmission/receiving in the same manner when images are input from the camera to a storage which is high-capacity storage means and when the data in the camera is projected/displayed by a projector or the like.

Figure 12:
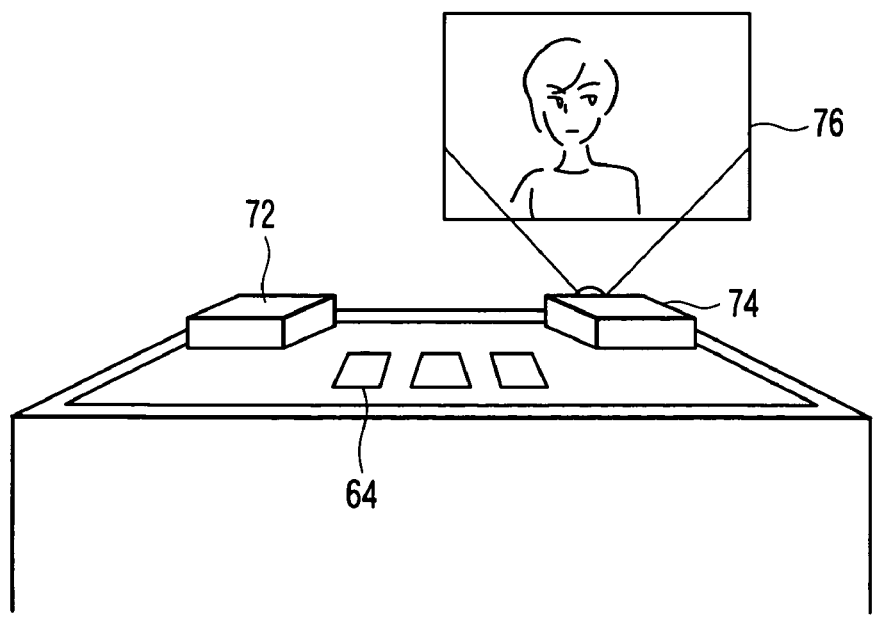
FIG. 12 is a diagram showing a modification of the second embodiment of the present invention wherein an image stored in a storage 50 is displayed on a screen by a projector 74.

For example, as shown in FIG. 12, there are mounted, on the table-type screen device, a storage 72 having a transmission function and a projector 74 having a receiving function. An image stored in the storage 72 which is a transmission device is displayed on the screen by the projector 74 which is a receiver, and an image 76 can be properly projected in a magnified form by the projector 74. In this case, for example, the image 64 is displayed on the screen 26 in the vicinity of the storage 72 or the projector 74. Alternatively, the image 64 may be displayed in the vicinity of both the storage 72 and the projector 74.

Furthermore, the touch panel function is used in the camera position detection and the printer position detection shown in FIGS. 9 to 11. However, the following example is also conceivable to differentiate the respective devices on the screen.

Figure 13A:
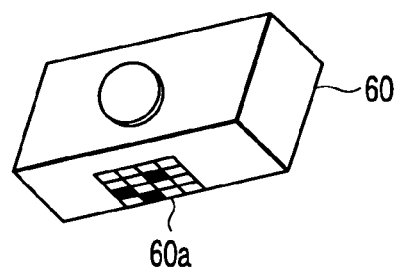
Figure 13B:
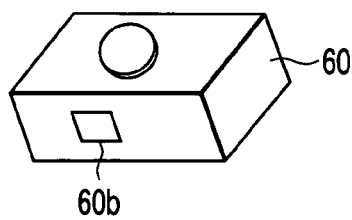
Figure 13C:
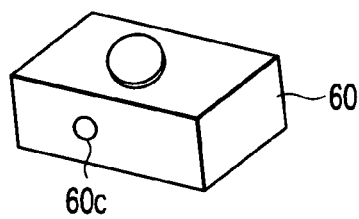

That is, as shown in FIG. 13A, a two-dimensional bar code 60a may be provided on a lower surface portion of the camera 60 or the like. Further, an IC tag 60b may be provided on the lower surface portion of the camera 60, as shown in FIG. 13B. Still further, an infrared communication device 60c may be provided on the lower surface portion of the camera 60, as shown in FIG. 13C.

Thus, various applications and modifications can be conceivable.

Figure 14:
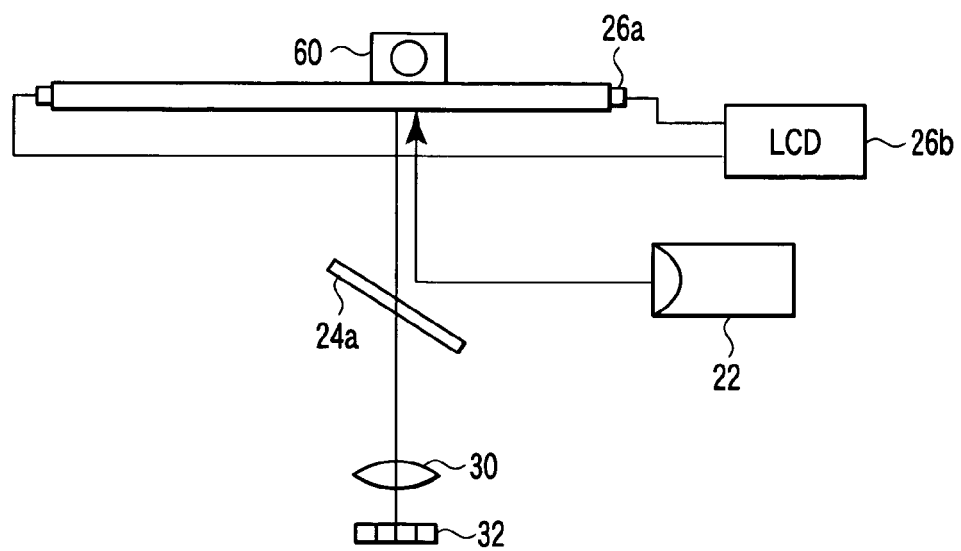
FIG. 14 is a diagram showing a configuration example of a position detection system of the camera in the digital platform apparatus of a type which reads the barcode as shown in FIG. 13A.

FIG. 14 is a diagram showing a configuration example of a position detection system of the camera in the digital platform apparatus of a type which reads, for example, the barcode 60a as shown in FIG. 13A.

Here, a screen 26a comprises an LCD which can be switched to be transmissive/light-diffusive. Further, an LCD control circuit 26b can electrically switch the screen 26a so that it is transmissive or light-diffusive. That is, when the barcode on the lower surface portion of the camera 60 is read, the screen 26a is made transmissive, and light of a projector 22 is applied to the barcode 60 by use of a half mirror 24a. Then, the reflected light is detected by a light-receiving lens 30 and a monitor image pickup device (sensor) 32. On the other hand, when images are displayed on the screen 26a, the screen 26a is switched to be light-diffusive.

FIG. 15 is a flowchart to explain an operation of detecting the barcode by the position detection system of the camera having such a configuration.

When a main routine begins, the screen 26a is first made transmissive in step S61. Then, in step S62, if uniform light is projected from the projector 22 in step S62, it is reflected by the half mirror 24a and led to the barcode 60a disposed on the lower surface portion of the camera 60.

Furthermore, in step S63, the light reflected by the barcode 60a is transmitted by the half mirror 24a, and read by the image pickup device 32 via the light-receiving lens 30. Thus, the position of the camera 60 is detected. Here, in step S64, the communication unit (see FIG. 1) communicates with the camera 60.

Next, in step S65, the screen 26a is switched into a light diffusion state by the LCD control circuit 26b so that an output image of the projector 22 can be displayed. Then, in step S66, the image in the camera 60 is projected from the projector 22 to reproduce/display it in the vicinity of the camera 60.

As described above, according to the second embodiment, code detection for detection of the device is used in addition to communication means based on radio waves for image data, thereby making is possible to more accurately judge information on and the position of the device.

Furthermore, in the first and second embodiments, the examples have been described in which the device is mounted on the table with the display function, and the present invention is not limited thereto.

For example, as shown in FIG. 16, a flat panel display 10a is stood on a general table 10b. In this state, if the camera 60 and the printer 70 are mounted on the table 10b, these devices are judged by communication units 48a and 48b. Then, image data recorded in an internal memory of the camera 60 is displayed as the image 64 on a virtual table 10c in the flat panel display 10a, as shown in the drawing.

In such a configuration, it is also possible to obtain effects similar to those in the first and second embodiments described above. In this example, the object of the present invention can also be achieved without using a display having a special table configuration.

According to the embodiments described above, the image contained in the device can be directly displayed, and when the image data is transferred, the image can be clearly indicated to the user during the transfer process, thereby ensuring transmission/receiving without causing a mistake in handling image signals.

Moreover, data manipulation can be intuitively achieved without requiring troublesome setting.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A digital platform apparatus comprising:
   a transmitter configured to store image data and transmit the stored image data;
   a receiver configured to receive the image data;
   a projection unit which projects an image corresponding to the image data received by the receiver;
   a display unit on which the transmitter and the receiver are mounted and which displays an image projected by the projection unit;
   a position detection unit which detects positions of the transmitter and the receiver mounted on the display unit; and
   a control unit which controls image data transfer from the transmitter to the receiver in accordance with a predetermined operation, the control unit controlling the projection unit to display an image corresponding to image data recorded in the transmitter in the vicinity of the transmitter detected by the position detection unit, and to display an image corresponding to image data specified by the predetermined operation in the vicinity of the receiver detected by the position detection unit when the image data is transferred to the receiver.

2. The digital platform apparatus according to claim 1, wherein
   the display unit comprises a translucent member having light diffusion properties.

3. The digital platform apparatus according to claim 1, wherein
   the control unit controls the projection unit to display the image to be displayed in the vicinity of the transmitter in a demagnified form, and display the image to be displayed in the vicinity of the receiver in a demagnified form.

4. The digital platform apparatus according to claim 1, further comprising:
   an operation judgment unit which detects and judges an operation of a user,
   wherein the control unit transfers the image data from the transmitter to the receiver on the basis of a result of the user operation judged by the operation judgment unit.

5. A digital platform apparatus comprising:
   a mounting unit to mount a transmitter which transmits image data recorded therein;
   a position detection unit which detects a position where the transmitter is mounted;
   an operation judgment unit which detects an operation performed on the mounting unit as an instruction to the transmitter;
   a communication unit which performs image data communication with the transmitter;
   a recording unit which records the image data communicated by the communication unit;
   a display unit which displays an image on the mounting unit; and
   a control unit which performs control so that an image concerning the imaging data transmitted from the transmitter is displayed as an image recorded in the transmitter in the vicinity of the mounted transmitter, and so that the image data transmitted from the transmitter in accordance with the operation is recorded in the recording unit, wherein
   the control unit displays the image recorded in the recording unit on the display unit in distinction from the image recorded in the transmitter and displayed in the vicinity of the transmitter.

6. A digital platform apparatus comprising:
   a mounting unit to mount a transmitter which transmits image data recorded therein;
   a position detection unit which detects a position where the transmitter is mounted;
   an operation judgment unit which detects an operation performed on the mounting unit as an instruction to the transmitter;
   a communication unit which performs image data communication with the transmitter;
   a recording unit which records the image data communicated by the communication unit;
   a display unit which displays an image on the mounting unit; and
   a control unit which performs control so that an image concerning the imaging data transmitted from the transmitter is displayed as an image recorded in the transmitter in the vicinity of the mounted transmitter, and so that the image data transmitted from the transmitter in accordance with the operation is recorded in the recording unit, wherein
   a receiver which receives the image data is further mounted on the mounting unit, and
   the communication unit communicates, to the receiver, the image data transmitted from the transmitter.

7. The digital platform apparatus according to claim 6, wherein
   the transmitter is a camera, and the receiver is a printer.

* * * * *